United States Patent
Avegliano et al.

(10) Patent No.: US 11,694,139 B2
(45) Date of Patent: Jul. 4, 2023

(54) DYNAMIC ASSIGNMENT OF TASKS TO INTERNET CONNECTED DEVICES

(71) Applicant: INTERNATIONAL BUSINESS MACHINES CORPORATION, Armonk, NY (US)

(72) Inventors: Priscilla Barreira Avegliano, São Paulo (BR); Carlos Henrique Cardonha, São Paulo (BR); Lucas Correia Villa Real, São Paulo (BR); Vagner Figueredo de Santana, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 337 days.

(21) Appl. No.: 16/188,661

(22) Filed: Nov. 13, 2018

(65) Prior Publication Data

US 2020/0151641 A1    May 14, 2020

(51) Int. Cl.
*G06Q 10/0631* (2023.01)
*G06Q 50/26* (2012.01)

(52) U.S. Cl.
CPC ..... *G06Q 10/06316* (2013.01); *G06Q 50/265* (2013.01)

(58) Field of Classification Search
CPC .......... H04W 4/21; H04W 4/14; H04W 4/20; H04M 2242/04; H04M 2242/30; G06Q 10/00; G06Q 30/02; H04L 65/403
See application file for complete search history.

(56) References Cited

U.S. PATENT DOCUMENTS

| | | | |
|---|---|---|---|
| 6,754,674 B2 | 6/2004 | Meyers et al. |
| 7,301,450 B2 | 11/2007 | Carrino |
| 8,073,731 B1 | 12/2011 | Rajasenan |
| 8,456,293 B1 | 6/2013 | Trundle et al. |
| 8,624,727 B2 | 1/2014 | Saigh et al. |
| 8,683,348 B1 | 3/2014 | Blank et al. |
| 9,047,871 B2 | 6/2015 | Dimitriadis et al. |
| 9,749,459 B2 | 8/2017 | Cardonha et al. |

(Continued)

FOREIGN PATENT DOCUMENTS

| | | |
|---|---|---|
| CN | 101476489 A | 7/2009 |
| JP | 2006301969 A | 11/2006 |
| KR | 100989332 B1 | 10/2010 |

OTHER PUBLICATIONS

Tannian, Initial Steps for IT Incident Visualization: Understanding Leadership Needs, Design and Evaluation, Jan. 1, 2015, 2015 48th Hawaii International Conference on System Sciences (IEEE), pp. 1128-1137 (Year: 2015).*

(Continued)

*Primary Examiner* — Robert D Rines
(74) *Attorney, Agent, or Firm* — Alexis N. Hatzis

(57) ABSTRACT

A method, computer system, and a computer program product for dynamic role assignment is provided. The present invention may include identifying a crisis event based on data collected by one or more internet-connected sensors. The present invention may then include selecting an incident plan based on the identified crisis event. The present invention may then include communicating an incident role to a registered device of a crowd member.

20 Claims, 7 Drawing Sheets

(56) References Cited

U.S. PATENT DOCUMENTS

| | | | |
|---|---|---|---|
| 2002/0029161 A1* | 3/2002 | Brodersen | G06Q 10/1093 |
| | | | 705/7.14 |
| 2006/0123053 A1 | 6/2006 | Scannell, Jr. | |
| 2011/0130636 A1 | 6/2011 | Daniel et al. | |
| 2012/0157795 A1* | 6/2012 | Chiu | H04L 67/52 |
| | | | 370/259 |
| 2012/0232944 A1* | 9/2012 | Zhu | G06Q 10/063112 |
| | | | 705/7.14 |
| 2012/0319869 A1 | 12/2012 | Dorfmann et al. | |
| 2014/0051379 A1* | 2/2014 | Ganesh | H04W 76/14 |
| | | | 455/404.1 |
| 2014/0227991 A1 | 8/2014 | Breton et al. | |
| 2015/0097683 A1 | 4/2015 | Sloo et al. | |
| 2015/0179038 A1 | 6/2015 | Daniel et al. | |
| 2015/0222672 A1* | 8/2015 | Vaughn | H04L 65/403 |
| | | | 709/204 |
| 2015/0245189 A1* | 8/2015 | Nalluri | H04M 1/2746 |
| | | | 455/404.1 |
| 2016/0014819 A1 | 1/2016 | Cona et al. | |
| 2016/0088099 A1* | 3/2016 | Crudele | H04L 51/222 |
| | | | 709/204 |
| 2016/0110591 A1 | 4/2016 | Smith et al. | |
| 2016/0124940 A1 | 5/2016 | Cecchi et al. | |
| 2017/0039505 A1* | 2/2017 | Prabhakara | G06Q 10/063112 |
| 2017/0193845 A1 | 7/2017 | Cardonha et al. | |
| 2018/0060987 A1 | 3/2018 | Cardonha et al. | |
| 2018/0081973 A1 | 3/2018 | Cardonha et al. | |
| 2018/0176362 A1* | 6/2018 | Cohen | H04M 1/72541 |
| 2020/0045161 A1* | 2/2020 | Cohen | H04W 4/029 |
| 2020/0117900 A1* | 4/2020 | Deng | H04W 4/02 |
| 2020/0151641 A1 | 5/2020 | Avegliano | |
| 2021/0014654 A1* | 1/2021 | Gupta | H04L 67/10 |
| 2021/0049881 A1* | 2/2021 | Connell, II | G06F 16/61 |

OTHER PUBLICATIONS

Mell et al., "The NIST Definition of Cloud Computing", Recommendations of the National Institute of Standards and Technology, NIST Special Publication 800-145, Sep. 2011, 7 pages.

Krytska et al., "IoT-based situation awareness support system for real-time emergency management", The 9th IEEE International Conference on Intelligent Data Acquisition and Advanced Computing Systems: Technology and Applications, Sep. 21-23, 2017, 6 pages.

Aurelio et al., Pending U.S. Appl. No. 15/615,052, filed Jun. 6, 2017, entitled "People Interruption Management System and Method Based On Task Detection and Physiological Measures", pp. 1-24.

Yana, et al., "IoT-Based Situation Awareness Support System for Real-Time Emergency Management," 9th IEEE International Conference on Intelligent Data Acquisition . . . (IDAACS), Sep. 21-23, 2017 [accessed on Oct. 7, 2020], pp. 955-960, IEEE, Bucharest, RO, DOI: 10.1109/IDAACS.2017.8095228, Retrieved from the Internet: <URL: https://ieeexplore.ieee.org/document/8095228>.

Wikipedia, "Hungarian Algorithm," Wikipedia, the Free Encyclopedia, [accessed on Oct. 28, 2021], 10 pgs., Retrieved from the Internet: <https://en.wikipedia.org/wiki/Hungarian_algorithm>.

* cited by examiner

DYNAMIC ASSIGNMENT OF TASKS TO INTERNET CONNECTED DEVICES

BACKGROUND

The present invention relates generally to the field of computing, and more particularly to sensor-based analytics.

Emergency response (i.e., disaster response) may be a critical task in instances of crowd panic. Support for panicked individuals, including the roles and tasks of emergency responders, may be predefined by emergency response organizations. Many emergency response organizations may determine that an emergency (i.e., a disaster) or other abnormal event is occurring based on posts in social networks, content from sensors and/or cameras, and/or media or other reports. The focus of emergency response organizations may be on the identification of the abnormal event and on the selection of predefined mitigation actions to address the identified abnormal event. The focus of emergency response organizations may further include the assignment of roles to emergency responders, based, among other things, on the emergency responders' skills and availability.

SUMMARY

Embodiments of the present invention disclose a method, computer system, and a computer program product for dynamic role assignment. The present invention may include identifying a crisis event based on data collected by one or more internet-connected sensors. The present invention may then include selecting an incident plan based on the identified crisis event. The present invention may then include communicating an incident role to a registered device of a crowd member.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
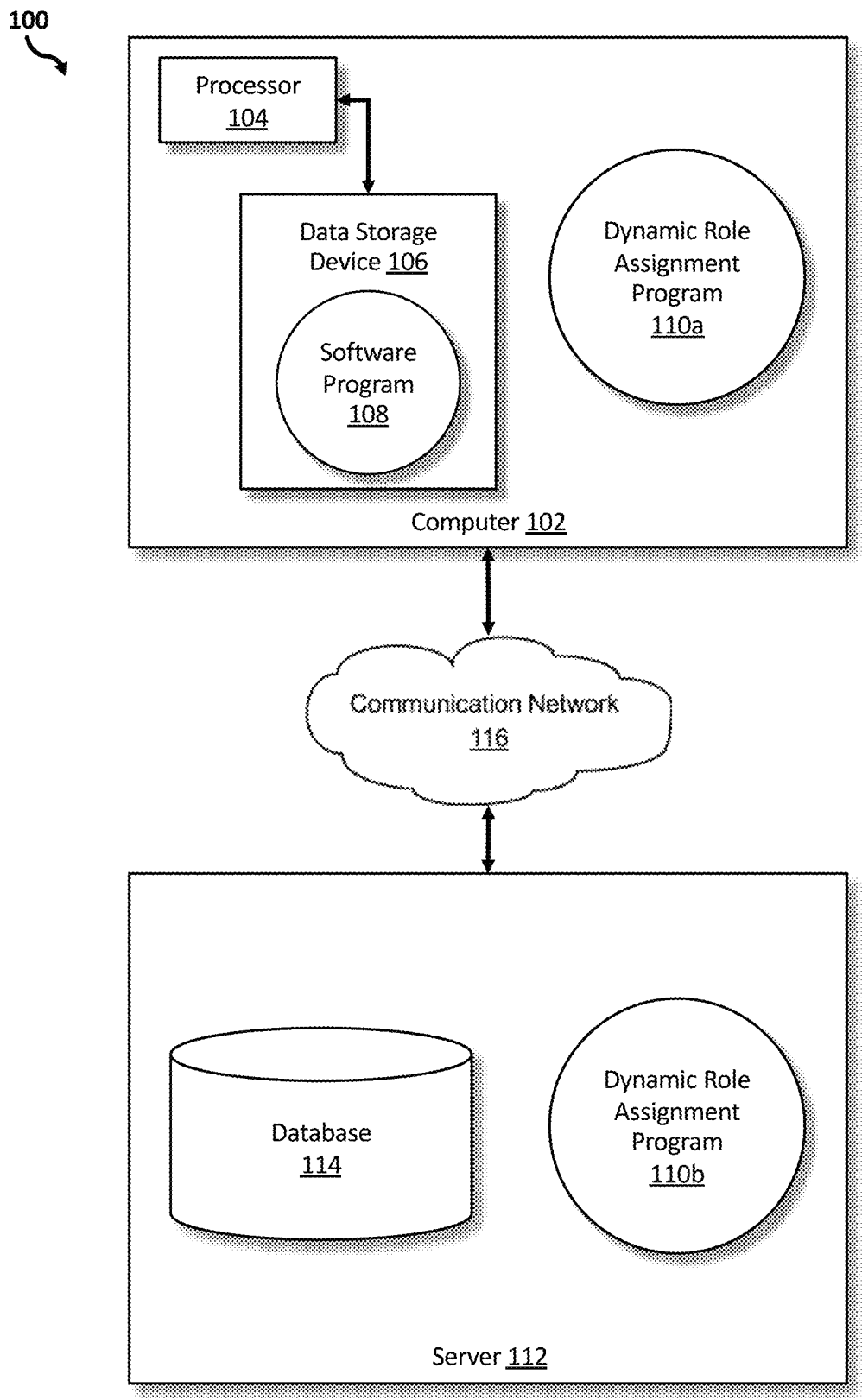
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for dynamic role assignment. As such, the present embodiment has the capacity to improve the technical field of sensor-based analytics by providing a means by which to identify emergency responders during a disaster situation, based on a determined physical and emotional state of an emergency responder, and further based on an ease by which communication may be made with the emergency responder, including but not limited to receipt of voice commands and maps with one or more routes to leave a dangerous location safely. An incident plan may be devised based on the disaster situation and the identified emergency responders. More specifically, the present invention may include identifying a crisis event based on data collected by one or more internet-connected sensors. The present invention may then include selecting an incident plan based on the identified crisis event. The present invention may then include communicating an incident role to a registered device of a crowd member.

As described previously, emergency response (i.e., disaster response) may be a critical task in instances of crowd panic. Support for panicked individuals, including the roles and tasks of emergency responders, may be predefined by emergency response organizations. Many emergency response organizations may determine that an emergency (i.e., a disaster) or other abnormal event is occurring based on posts in social networks, content from sensors and/or cameras, and/or media or other reports. The focus of emergency response organizations may be on the identification of the abnormal event and on the selection of predefined mitigation actions to address the identified abnormal event. The focus of emergency response organizations may further include the assignment of roles to emergency responders, based, among other things, on the emergency responders' skills and availability.

Existing disaster response (i.e., emergency response) solutions may assume that there are enough disaster responders available to mitigate the disaster, and further that the available disaster response individuals are both physically and emotionally fit to respond to the disaster and/or abnormal event. Existing disaster response solutions may assume that these conditions have been met (e.g., that there are enough disaster responders to mitigate the disaster, and that the available disaster responders are both physically and emotionally fit to respond to the disaster and/or abnormal event) without confirming, in real-time, through biometric and/or other sensors and cameras located on mobile devices and/or tablets of crowd members. Sensor and camera data may reveal that available individuals are either occupied, insufficient in number, or may have a current physical and/or emotional state which may not be adequate to handle the disaster and/or abnormal event. In these instances, disaster response tasks may be performed by untrained crowd members, who may instantaneously react to and assist with the disaster and/or abnormal event.

Therefore, it may be advantageous to, among other things, provide a solution for disaster management, which takes into account the capabilities of nearby individuals (e.g., the estimated physical and emotional state of trained and/or untrained crowd members), based on data communicated by the crowd members' mobile devices, tablets, and/or cameras, in order to select an adequate disaster response team in real-time.

According to at least one embodiment, a disaster response team may be assembled to provide assistance after a disaster and/or an abnormal event. A disaster response team may be comprised of one or more trained and/or untrained individuals who may assist in the response and mitigation of a disaster. A trained individual may make disaster response decisions based on information derived from assessments, strategies, and plans developed in and taught by certified disaster response training programs.

According to at least one embodiment, the disaster response team may be comprised of crowd members and support staff, among other individuals, who may be assigned roles based on a determined physical state and a determined emotional state, gathered from internet-connected sensors and/or cameras, among other internet-connected devices, and further based on an availability of the individual to receive communications which may include, but are not limited to including, voice commands and maps with paths indicating how to leave a disaster location safely.

According to at least one embodiment, a disaster response plan may be devised based on a determined physical and emotional state of an individual, and further based on an individual's physical ability. A disaster response plan may vary based on availability of local individuals.

According to at least one embodiment, a crowd member may be identified by the crowd member's facial expression, based on data collected from an internet-connected body camera of one or more other crowd members. The crowd member's face may be compared, using machine learning algorithms, to a database of images representing the faces of users registered with the dynamic role assignment program. Once a crowd member is identified, a triggering event may be sent to the body camera of the nearby crowd member, in order to start recording the expression of the identified crowd member and to determine the emotional and physical condition of the crowd member.

According to at least one embodiment, an emotional, physical, and geographic attribute of an individual may be considered in order to identify individuals (e.g., crowd members) who may be capable of performing one or more tasks in connection with a determined disaster response plan.

According to at least one embodiment, one or more tasks may be assigned to an individual in real-time, based on an analysis of the emotional, physical, and geographic attributes of the individual. The one or more assigned tasks may be related to disaster response and/or crisis management, and may involve responding safely, responsibly, and effectively to the disaster and/or abnormal event.

According to at least one embodiment, there may be one or more connected databases, including but not limited to a response plan database, which may include a list of incidents (i.e., disaster, emergency, abnormal event) and incident plans for each listed incident. The incident plans within the response plan database may include a list of individual roles which make up the given incident plan. Each role may specify a list of skills and/or emotional requirements of an individual who may be assigned to that role. Each role may further include a sequence of tasks required to be taken by an individual assigned to that role. The one or more connected databases may also include a database of user profiles, which may be retrieved from historical data and/or social networks, among other sources.

According to at least one embodiment, there may be one or more connected devices for event detection, including but not limited to camera devices and environmental sensors to capture noise and/or temperature. There may also be one or more connected end-user devices, including but not limited to internet connected (e.g., internet of things (IoT) enabled) sensors, internet connected watches, internet connected trackers and/or one or more other internet-connected devices.

According to at least one embodiment, there may be a defined disaster response plan and/or contingency plan which may include one or more roles to be assigned to crowd members and/or support staff, based on a present psychological (e.g., emotional) state of mind of the individuals and/or a present physical ability of the individuals.

According to at least one embodiment, a connected emotional state database may be responsible for storing emotional indicators gathered from the internet connected devices of one or more crowd members and a connected control processing unit (CPU) may be responsible for determining a present emotional state of the crowd members, based on the emotional indicators stored within the emotional state database.

According to at least one embodiment, a connected CPU may be capable of selecting a crowd member which best fits the psychological (e.g., emotional) and physical profile requirements of an incident plan contained within the response plan database.

According to at least one embodiment, there may be a connected communication module responsible for informing an individual (e.g., a crowd member) of the individual's task and for requesting the individual's acceptance and/or confirmation of the assigned task. The communication module may also provide guidance to the individual which may be needed to perform the assigned task. The guidance may include direction on what needs to be performed (e.g., traverse a defined route, unlock a door, and/or break a window, among other tasks). The instructions may be provided by using one or more communication methods, including but not limited to oral, written (e.g., Short Message Service (SMS) text messages and/or email), and/or visual (e.g., by displaying instructions on a pictorial map), depending on the capabilities of the device used by the individual and any preferences and/or limitations of the individual (e.g., an inability to hear and/or see).

According to at least one embodiment, there may be a connected module capable of monitoring the evolution of the emotional state of the individual (e.g., crowd member) during the performance of an assigned task, in order to assess whether the individual continues to be capable of performing the assigned task. There may be several ways in which the emotional state of the individual can be monitored. For example, given the widespread use of internet-connected sensors embedded in mobile devices and tablets, the dynamic role assignment program may gather the emotional state of an individual by monitoring data collected by the internet-connected sensors. This may include monitoring an individual's heart rate, eye movement, body temperature, voice pitch, and breathing rate, among other things.

Movement sensors (e.g., internet-connected accelerators) may provide hints about the physical state of an individual including, but not limited to, whether the individual is capable of freely moving and/or is restricted in any movements.

Likewise, a psychological (e.g., emotional) state of an individual may be monitored by reviewing answers provided by the individual to a questionnaire. Individuals may either register a priori in a unified system or may be requested to join and provide responses to a questionnaire in real-time, at the time that a crisis situation (e.g., a disaster situation, an emergency situation, an abnormal event) is occurring within close proximity to the location of the individual. Based on the current state of the crisis and on a current emotional state of the individual, the dynamic role assignment program may ask the individual to assume a role in the crisis situation (e.g., the individual may be assigned a defined role within an incident response plan).

According to at least one embodiment, an individual may provide a formal acceptance to a role assignment by the dynamic role assignment program. The individual may include within a formal response any special abilities and/or skills which may be used by the individual in responding to the disaster situation (e.g., the individual may describe formal training and work as a medical doctor).

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a dynamic role assignment program 110a. The networked computer environment 100 may also include a server 112 that is enabled to run a dynamic role assignment program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the dynamic role assignment program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the dynamic role assignment program 110a, 110b (respectively) to provide a means by which to identify emergency responders during a disaster situation, based on a determined physical and emotional state of an emergency responder, and further based on an ease by which communication may be made with the emergency responder, including but not limited to receipt of voice commands and maps with one or more routes to leave a dangerous location safely. An incident plan may be devised based on the disaster situation and the identified emergency responders. The dynamic role assignment method is explained in more detail below with respect to FIGS. 2A and 2B, and 3.

Figure 2A:
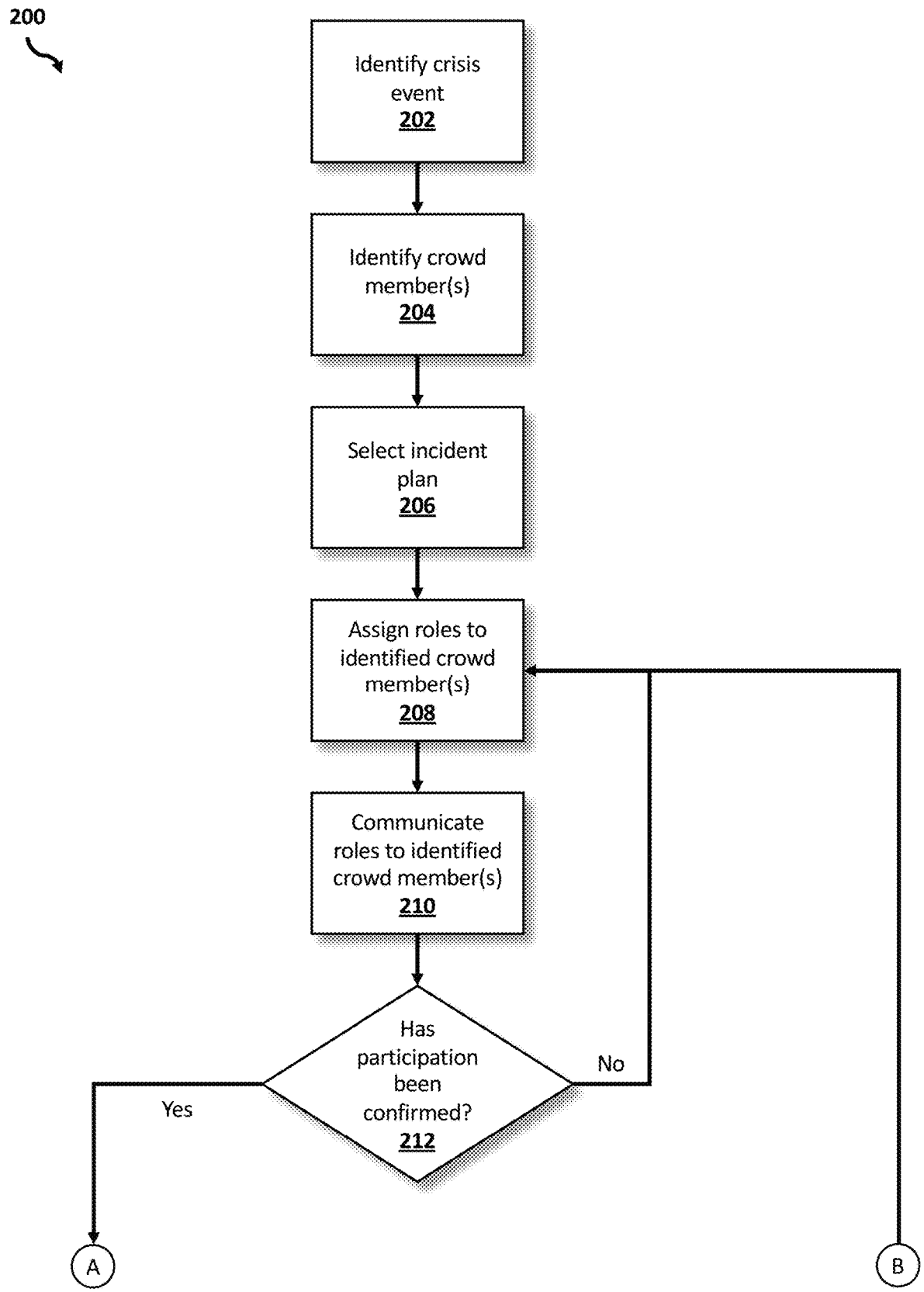
FIGS. 2A and 2B are an operational flowchart illustrating a process for dynamic role assignment according to at least one embodiment.
Figure 2B:
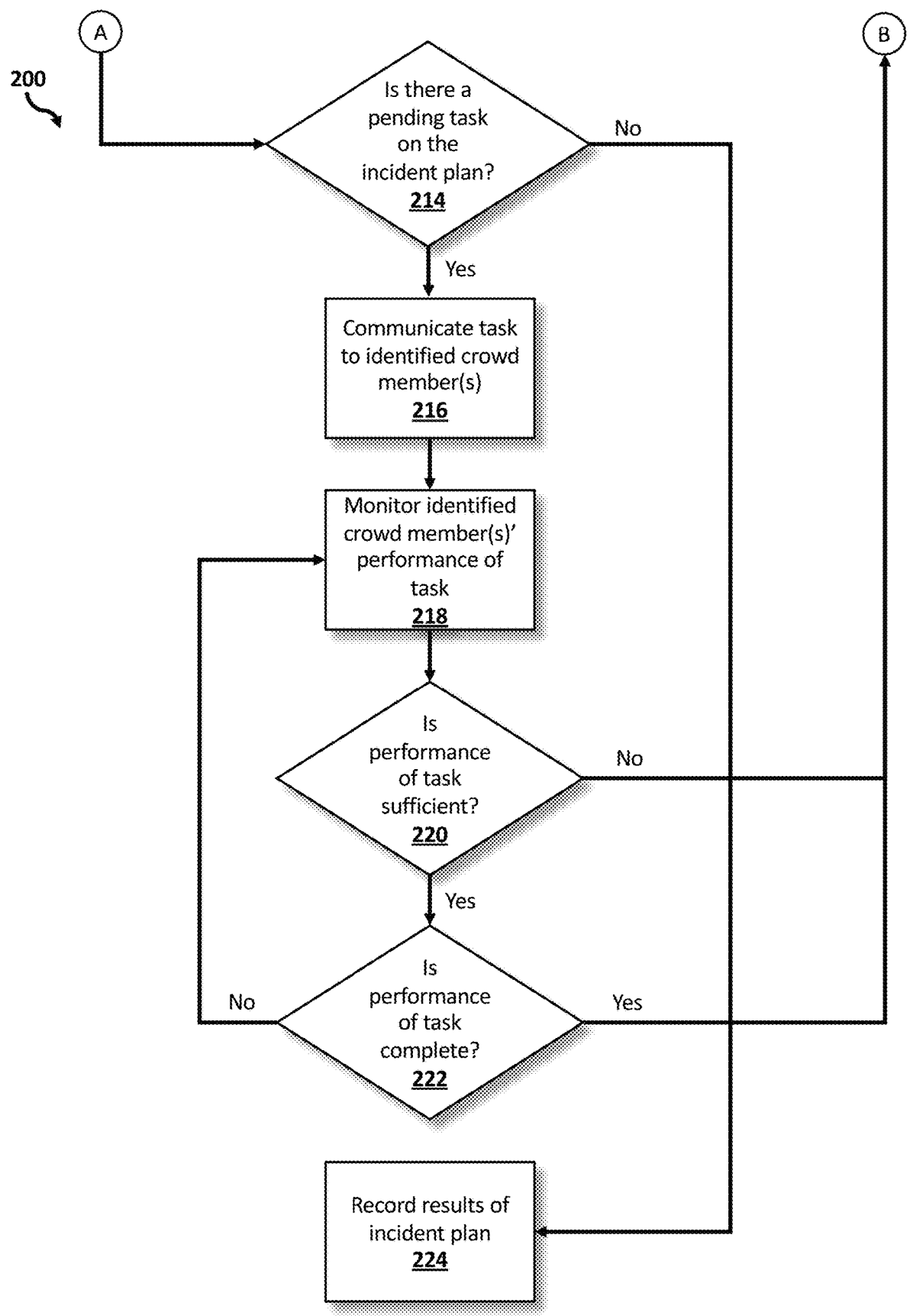

Referring now to FIGS. 2A and 2B, an operational flowchart illustrating the exemplary dynamic role assignment process 200 used by the dynamic role assignment program 110a and 110b according to at least one embodiment is depicted.

At 202, a crisis event is identified. A crisis event may be identified when internet-connected cameras and/or other internet-connected devices capture abnormal human activity in public locations (e.g., train stations, airports), when internet-connected cameras and/or other internet-connected devices capture abnormal human activity in controlled locations (e.g., airplanes, business locations), and/or when internet-connected smoke detectors and/or other internet-connected devices capture information which may indicate that an abnormal event is occurring. The dynamic role assignment program 110a, 110b may periodically gather information about conditions of a location covered by the internet-connected devices and may store the gathered information in a location database (e.g., database 114). Machine learning algorithms may be utilized to analyze gathered information about a location, to establish a baseline for a given location (e.g., an average condition of the location), and to compare newly gathered data to the established baseline.

Gathered information that may not be in line with the established baseline and may not be within a predefined distance from the established baseline, may be determined by the dynamic role assignment program 110a, 110b to be a crisis event.

At 204, one or more crowd members are identified. One or more crowd members located near the identified crisis event may be identified using, for example, a determined location gathered from a registered mobile device, among other data of the user's mobile device or tablet.

For each of the one or more identified crowd members, the dynamic role assignment program 110a, 110b may retrieve a user profile from a connected user profiles database (e.g., database 114), and may update the retrieved user profile with all available forms of sensor data, including sensor data relating to an emotional state of the user and sensor data relating to a psychological or psychophysiological state of the user. A precise location of the identified crowd member may be determined, based on the gathered sensor data, and all available communication channels, including but not limited to all capabilities of the user's mobile device and/or tablet may be retrieved and inputted into the user profile of the dynamic role assignment program 110a, 110b. The inputting of capabilities of the user's mobile device and/or tablet into the dynamic role assignment program 110a, 110b may be done automatically based on information retrieved from the user's mobile device and/or tablet, or may be done manually by the user.

Based on the aforementioned gathered information, the dynamic role assignment program 110a, 110b may generate a complete and up-to-date data set (e.g., a data package, a user profile) comprising all information of the particular user.

At 206, an incident plan is selected. The dynamic role assignment program 110a, 110b may select an incident plan based on the identified event (e.g., disaster event, emergency event, crisis event), previously described with respect to step 202 above, and further based on the identified crowd members (e.g., the available crowd members within a close proximity to the identified event), previously described with respect to step 204 above.

An incident plan may be selected based on one or more industry standards, which may be provided by one or more industry sources (e.g., disaster response and/or emergency response organizations). An incident plan may also be selected based on data contained within the response plan database (e.g., database 114), which may be connected to the dynamic role assignment program 110a, 110b, and which may include responses to incidents identified by the dynamic role assignment program 110a, 110b. The response plan database may include criteria and circumstances which may be used to determine an appropriate course of action for the identified incident (i.e., an incident plan). The response plan database may be updated and/or modified by the dynamic role assignment program 110a, 110b with results of the selected incident plan, as will be described in more detail with respect to step 224 below.

For example, if the dynamic role assignment program 110a, 110b determines at step 202 above that the identified event is a fire, then the incident plan may include individual roles for turning equipment off, sounding an alarm, and attempting to extinguish the fire, among other things.

At 208, the dynamic role assignment program 110a, 110b assigns roles to identified crowd members. The dynamic role assignment program 110a, 110b may identify the most suitable assignment of individuals to roles, based on an individual's location, skills, emotional state, and/or ability to communicate with the dynamic role assignment program 110a, 110b. An emotional state and/or a psychological state may be based on sensory data gathered from an identified crowd member's (i.e., an individual's) mobile device, tablet, smart watch, or activity monitor, among other connected devices.

The dynamic role assignment program 110a, 110b may calculate a score in order to determine the appropriate assignment of an identified crowd member. A calculated score may be based on information gathered from the retrieved user profile, previously described with respect to step 204 above. Information gathered from the retrieved user profile may include, but is not limited to including, a skill level of the identified crowd member, any educational or other training which may be used in the individual's response to the identified event, an emotional state of the identified crowd member based on data collected from internet-connected devices, and a proximity of the identified crowd member to the identified crisis event.

For example, based on a predetermined preference of the dynamic role assignment program 110a, 110b and based on any requirements of the selected incident plan, an identified crowd member located within the closest proximity to the identified crisis event may be attributed the highest overall score.

A score may be calculated by the dynamic role assignment program 110a, 110b using an algorithm to determine the best assignment of identified crowd members to roles within the selected incident plan. The best assignment may be identified by explicit enumeration (e.g., by evaluating all possible assignments selecting the best one). In scenarios where the underlying assignment problem is too large, more advanced and efficient strategies may be employed, such as the Hungarian algorithm, or other mixed-integer linear programming formulations.

At 210, assigned roles are communicated to identified crowd members. Communicating a role assignment to an identified crowd member may include, but is not limited to including, sending a notification or message to the identified crowd member's mobile device or tablet, or by providing an audio message on the identified crowd member's connected audio device (e.g., through a mobile device or tablet speaker or through a connected headphone).

Assigned roles may also be communicated by broadcast message to all users of the dynamic role assignment program 110a, 110b.

A communication may include a click-through link, enabling the identified crowd member (i.e., the user) to confirm participation in the selected incident plan. Some previously enrolled users, who participated in incident plans in the past, may indicate a willingness to participate in any incident plan that the dynamic role assignment program 110a, 110b determines is appropriate for the user. In this case, a confirmation of the assigned role may be automatic. In certain circumstances, the confirmation of an assigned role may be made through voice commands and/or pre-defined user gestures, among other means of user acceptance.

At 212, it is determined that the identified crowd member's participation has been confirmed. The dynamic role assignment program 110a, 110b may determine whether all notified individuals (e.g., all identified crowd members who were communicated an assigned role, as described previously with respect to step 210 above) have confirmed participation in the selected incident plan.

A notified individual (i.e., a user) may confirm participation by responding to the communication which assigned a role to the identified crowd member. Confirmation of participation may be done using a click-through link, as described previously with respect to step 210 above, as well as other means of confirming participation.

The dynamic role assignment program 110a, 110b may request acknowledgement from the identified crowd member that performance of the communicated role may be possible.

At 214, it is determined that there is a pending task on the incident plan. The dynamic role assignment program 110a, 110b determines that there is a pending task on the incident plan. A task may be considered as an action with an associated objective. The task may be achieved if and only if the objective is reached. Additionally, each task may have prerequisite conditions which may be required to be met before the task can be complete. This may include an emotional, psychological, and physical state of the assignee. Criteria driving the preference of an assignment may be one or more of proximity to the incident location, an expected execution time, and psychological and physical conditions, among other things. While the selected incident plan has pending tasks, the pending tasks may be distributed to identified crowd members based on the identified crowd members' roles and further based on the sequence of actions defined by the selected incident plan.

A crowd member may be assigned a particular task based on the crowd member's assigned role, and further based on the requirements of the pending task. For example, if a pending task has a physical component, the dynamic role assignment program 110a, 110b may need to determine, based on gathered sensor data, whether the crowd member is physically capable of handling the pending task. This may include heart rate, physical fitness, weight, and height, among other factors which may influence whether a crowd member may be able to handle a pending task.

At 216, the task is communicated to an identified crowd member. The dynamic role assignment program 110a, 110b may send personalized guidelines to an identified crowd member, based on the assigned role and task of the identified crowd member. Communicating a task assignment to an identified crowd member may include, but is not limited to including, sending a notification or message to the identified crowd member's mobile device or tablet, or by providing an audio message on the identified crowd member's connected audio device (e.g., through a mobile device or tablet speaker or through a connected headphone), as described previously with respect to step 208 above.

At 218, the performance of the identified crowd member's task is monitored. This may include, for example, keeping a record of the crowd member's execution of the assigned task, and comparing a current execution time to an expected execution time for the communicated task. Monitoring performance may also include, but is not limited to including, maintaining an emotional state of the identified crowd member to ensure that the identified crowd member is still in the optimal condition to handle the respective task, and further that the identified crowd member is more able than other crowd members to handle the respective task.

At 220, it is determined that the identified crowd member's performance of the task is sufficient. Sufficiency may reflect the fact that the task was completed as expected (e.g., based on a time consideration, based on a resulting outcome, based on a lack of casualties, and based on a lack of additional resulting incidents, among other considerations). The dynamic role assignment program 110a, 110b may periodically analyze whether the identified crowd member's performance of the assigned task is sufficient. The frequency with which an analysis of performance is completed may be predefined within the dynamic role assignment program 110a, 110b (e.g., determine whether performance is sufficient every 30 seconds, etc.).

At 222, it is determined that the identified crowd member's performance of the task is complete, and at 208, the dynamic role assignment program 110a, 110b assigns a new role to the identified crowd member. An identified crowd member's performance may be determined to be satisfactorily complete based on an indication from another identified crowd member whose role within the selected incident plan is to manage the tasks of all other identified crowd members and to indicate within a management portal for the dynamic role assignment program 110a, 110b whether identified crowd members have satisfactorily completed assigned tasks.

An identified crowd member's performance may also be determined to be satisfactorily complete based on a checklist and/or questionnaire completed by the identified crowd member, wherein the identified crowd member may indicate whether or not the task has been completed, and wherein the identified crowd member may provide updated emotional and/or physical status and conditions. The checklist and/or questionnaire may be uploaded and/or submitted to the dynamic role assignment program 110a, 110b upon the identified crowd member's completion of the task, and the dynamic role assignment program 110a, 110b may extract personal information provided by the identified crowd member and place the personal information within the identified crowd member's user profile.

The dynamic role assignment program 110a, 110b may further utilize details provided by the user regarding results and/or outcomes of the assigned task, and may compare the provided details to a historical database of details concerning completion of the same task. In doing so, the dynamic role assignment program 110a, 110b may make an intelligent determination as to whether anything may be outstanding with respect to the identified crowd member's performance of the assigned task.

When an identified crowd member's performance of an assigned task is determined to be complete, then at 208, the assigned tasks and/or roles of the identified crowd member may be modified. A task within a given role may be modified based on the fact that the prior assigned task has been completed. Alternatively, an assigned role may change significantly from the initial assigned role based on a change in the physical and/or emotional condition of the identified crowd member (e.g., fatigue and/or distress, among other emotional and/or physical changes).

If, at 212, it is determined that the identified crowd member's participation has not been confirmed, then at 208 the role is assigned to a remaining crowd member who is not responsible for another pending task. An identified crowd member's participation may have not been confirmed if the identified individual provides an explicit response indicating that the assigned role may not be performed, or has not responded to the role assignment within a reasonable amount of time, which time may be preconfigured by the dynamic role assignment program 110a, 110b, among other means of configuring a response timeout mechanism.

If, at 214, the dynamic role assignment program 110a, 110b determines that there is no pending task on the incident plan, then at 224 the results of the incident plan are recorded. When no tasks are pending on the incident plan relative to the identified crisis event, the dynamic role assignment program 110a, 110b may record results of the incident plan in a historical database, which may be used to improve the selection of incident plans and assignment of roles and/or tasks in the future.

If, at 220, it is determined that the identified crowd member's performance of the task is not sufficient, then at 208, the task is reassigned to a different identified crowd member. In instances where the identified crowd member may not be able to perform the task, based on a change in the physical and/or emotional state of the identified crowd member, among other reasons, then the dynamic role assignment program 110a, 110b would have determined a new optimal crowd member for performance of the task within the selected incident plan.

If, at 222, it is determined that the identified crowd member's performance of the task is not complete, then at 218, the performance of the identified crowd member's task continues to be monitored.

Figure 3:
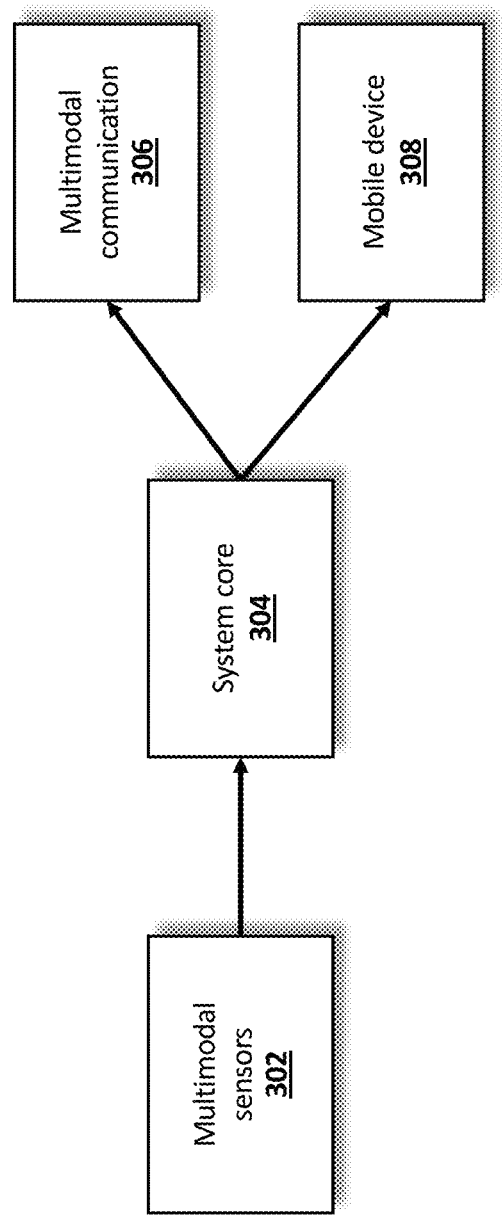
FIG. 3 is a block diagram of the architecture overview of the dynamic role assignment program according to at least one embodiment.

Referring now to FIG. 3, a block diagram of the architecture overview of the dynamic role assignment program 110a, 110b according to at least one embodiment is depicted. The block diagram of the architecture overview 300 may include multimodal sensors 302, system core 304, multimodal communication 306, and mobile device 308. Multimodal sensors 302 may include, but are not limited to including, surveillance cameras, interaction data from mobile devices and terminals. System core 304 receives the information collected by a set of sensors and compares it to a predetermined range of possible values. If the measured signals are significantly different from the predetermined range, an alert may be triggered. Further, if multiple sensors present discrepancies at the same time, a crisis may be diagnosed by the dynamic role assignment program 110a, 110b. Based on the nature of the detected crisis, the system selects the associated incident plan. Multimodal communication 306 may include visual displays, audio messages, and/or textual messages, among other things. Mobile device 308 is used for communication between the system and volunteers, which may involve assistance requests, confirmations, and guidelines.

It may be appreciated that FIGS. 2A and 2B, and 3 provide only an illustration of one embodiment and do not imply any limitations with regard to how different embodiments may be implemented. Many modifications to the depicted embodiment(s) may be made based on design and implementation requirements.

Figure 4:
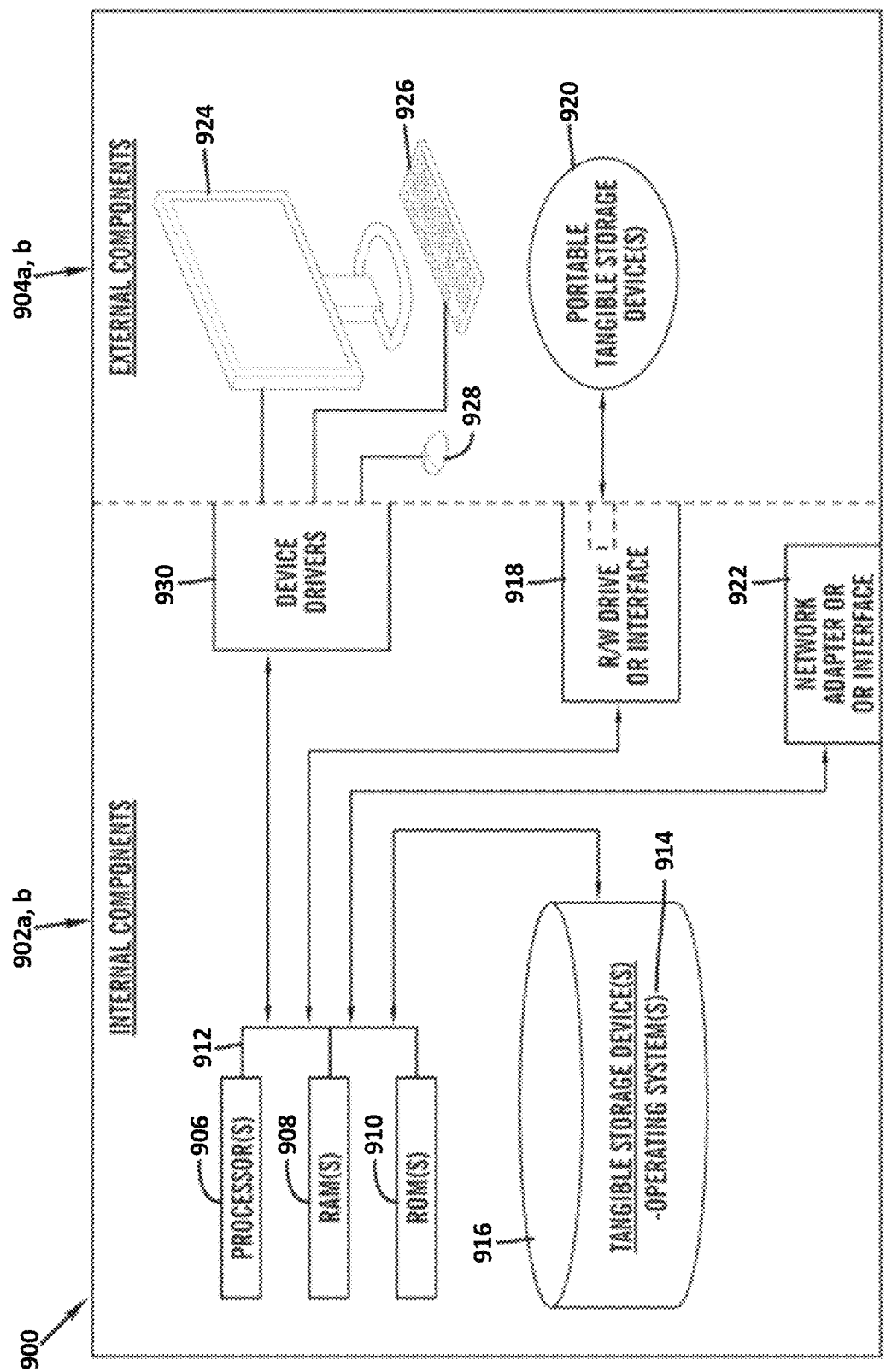
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the dynamic role assignment program 110a in client computer 102, and the dynamic role assignment program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the dynamic role assignment program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the dynamic role assignment program 110a in client computer 102 and the dynamic role assignment program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the dynamic role assignment program 110a in client computer 102 and the dynamic role assignment program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
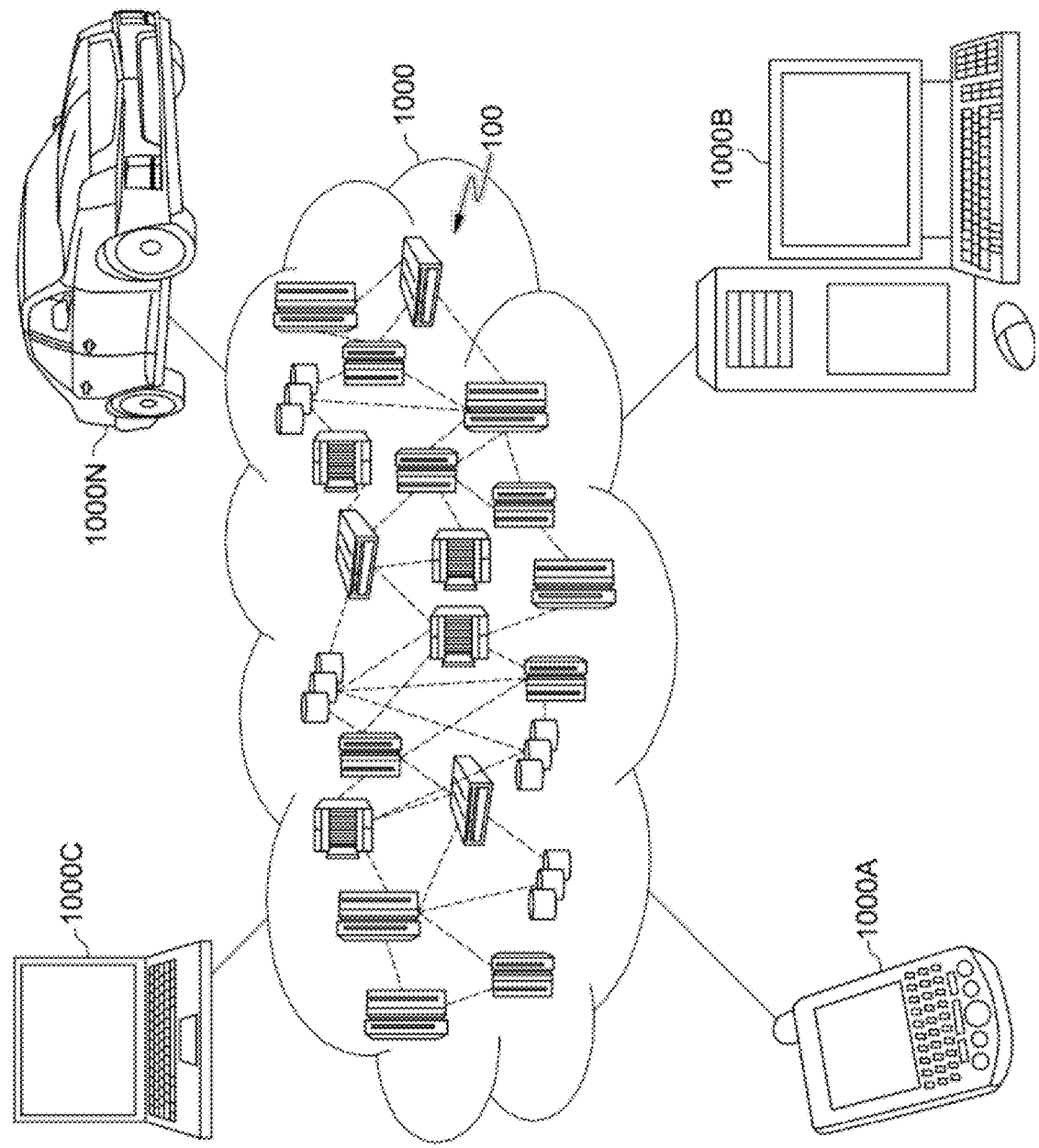
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
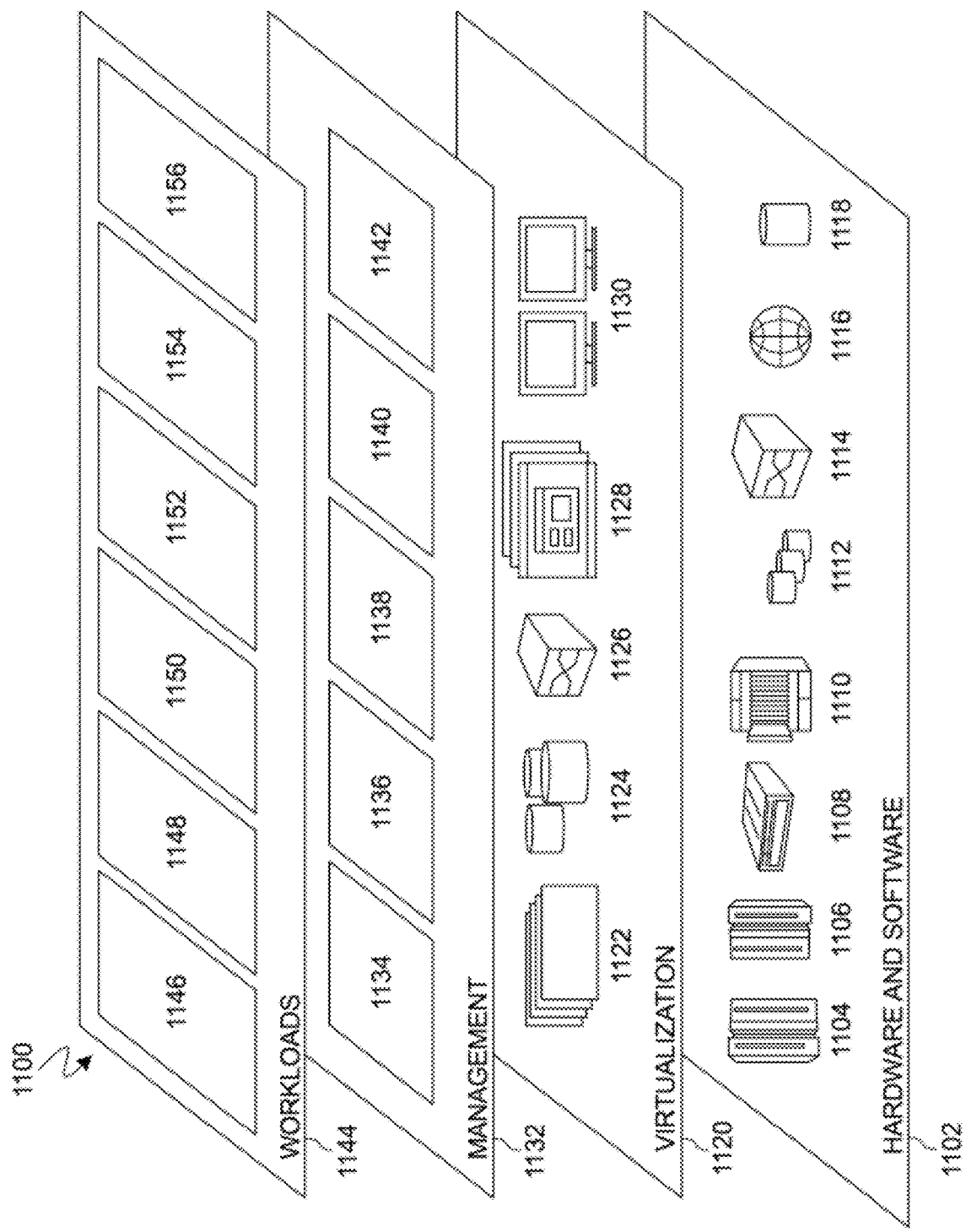
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and dynamic role assignment 1156. A dynamic role assignment program 110a, 110b provides a way to assign roles to individuals (e.g., crowd members and/or support staff) in a disaster response situation, in real-time, based on a selected incident plan, a current physical state and/or a current emotional state of the individuals, and further based on an ability of the individuals to be reached (e.g., to be communicated with, to receive commands, etc.).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamic role assignment, the method comprising:
    identifying, by one or more processors, a crisis event based on data collected by one or more Internet-connected multimodal sensors, wherein the collected sensor data is received and analyzed by the one or more processors, wherein the one or more processors identifies the crisis event by detecting a divergence of the collected sensor data from baseline value ranges of sensor data for a location observed by the one or more internet-connected multimodal sensors, wherein the one or more processors establishes and iteratively updates the baseline value ranges of sensor data for the location based on continuous sensor data collected by one or more internet-connected multimodal sensors for the location observed by the one or more internet-connected multimodal sensors using at least one machine learning algorithm;
    responsive to identifying the crisis event based on the detected divergence of collected sensor data, selecting, by the one or more processors, an incident plan;
    identifying, by the one or more processors, a plurality of crowd members based on the identified crisis event and the selected incident plan, wherein each of the plurality of crowd members is associated with a registered device;
    selecting, by the one or more processors, a crowd member from the plurality of crowd members, by interrogating the one or more Internet-connected multimodal sensors and sensors of registered devices of crowd members to generate sensor data indicative of a physical location of the crowd member and to verify an ability of the crowd member to participate in the incident plan, wherein the one or more processors execute a mixed-integer linear programming formulation to calculate a score, wherein the score is calculated based on a plurality of user profile information and crowd member data collected by the one or more internet-connected multimodal sensors and the sensors of the registered devices of a crowd members, wherein the score and the plurality of user profile information and crowd member data is used in selecting the crowd member; and
    communicating, using a communication module on the one or more processors, an incident role to the registered device of the crowd member, wherein the incident role is communicated by audio message to the crowd member's registered device.

2. The method of claim 1, further comprising:
    determining a current emotional condition and a current physical condition of the crowd member based on data collected by the one or more internet-connected sensors.

3. The method of claim 1, further comprising:
    determining that there is a pending task on the selected incident plan; and
    communicating, by the communication module on the one or more processors, the pending task to the registered device of the crowd member based on determining by the sensor data that the crowd member meets a plurality of prerequisite conditions of the pending task.

4. The method of claim 3, further comprising:
    requesting an acknowledgement via communication from the registered device of the crowd member that the communicated incident role can be performed, and if the requested acknowledgement is not received, reassigning the communicated incident role by communicating the incident role using the communication module on the one or more processors to a remaining crowd member who is not responsible for another pending task.

5. The method of claim 4, further comprising:
    monitoring the crowd member data, wherein the crowd member data is selected from the group consisting of a status of the incident task, the current physical condition of the crowd member, and the current emotional condition of the crowd member.

6. The method of claim 5, further comprising:
    receiving a communication from the registered device of the crowd member that the incident task is complete;
    initiating a test of sufficiency, based on the received communication that the incident task is complete, wherein the test of sufficiency includes receiving a confirmation communication in a management portal from a second registered device of a second crowd member; and
    communicating a new incident task to the registered device of the crowd member.

7. The method of claim 1, further comprising:
    determining that there are no outstanding incident tasks; and
    recording a result of the selected incident plan.

8. A computer system for dynamic role assignment, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    identifying, by one or more processors, a crisis event based on data collected by one or more Internet-connected multimodal sensors, wherein the collected sensor data is received and analyzed by the one or more processors, wherein the one or more processors identifies the crisis event by detecting a divergence of the collected sensor data from baseline value ranges of sensor data for a location observed by the one or more internet-connected multimodal sensors, wherein the one or more processors establishes and iteratively updates the baseline value ranges of sensor data for the location based on continuous sensor data collected by one or more internet-connected multimodal sensors for the location observed by the one or more internet-connected multimodal sensors using at least one machine learning algorithm;

responsive to identifying the crisis event based on the detected divergence of collected sensor data, selecting, by the one or more processors, an incident plan;

identifying, by the one or more processors, a plurality of crowd members based on the identified crisis event and the selected incident plan, wherein each of the plurality of crowd members is associated with a registered device;

selecting, by the one or more processors, a crowd member from the plurality of crowd members, by interrogating the one or more internet-connected multimodal sensors and sensors of registered devices of crowd members to generate sensor data indicative of a physical location of the crowd member and to verify an ability of the crowd member to participate in the incident plan, wherein the one or more processors execute a mixed-integer linear programming formulation to calculate a score, wherein the score is calculated based on a plurality of user profile information and crowd member data collected by the one or more internet-connected multimodal sensors and the sensors of the registered devices of a crowd members, wherein the score and the plurality of user profile information and crowd member data is used in selecting the crowd member; and communicating, using a communication module on the one or more processors, an incident role to the registered device of the crowd member, wherein the incident role is communicated by audio message to the crowd member's registered device.

9. The computer system of claim 8, further comprising:
determining a current emotional condition and a current physical condition of the crowd member based on data collected by the one or more internet-connected sensors.

10. The computer system of claim 8, further comprising:
determining that there is a pending task on the selected incident plan; and
communicating, by the communication module on the one or more processors, the pending task to the registered device of the crowd member based on determining by the sensor data that the crowd member meets a plurality of prerequisite conditions of the pending task.

11. The computer system of claim 10, further comprising:
requesting an acknowledgement via communication from the registered device of the crowd member that the communicated incident role can be performed, and if the requested acknowledgement is not received, reassigning the communicated incident role by communicating the incident role using the communication module on the one or more processors to a remaining crowd member who is not responsible for another pending task.

12. The computer system of claim 11, further comprising:
monitoring the crowd member data, wherein the crowd member data is selected from the group consisting of a status of the incident task, the current physical condition of the crowd member, and the current emotional condition of the crowd member.

13. The computer system of claim 12, further comprising:
receiving a communication from the registered device of the crowd member that the incident task is complete;

initiating a test of sufficiency, based on the received communication that the incident task is complete, wherein the test of sufficiency includes receiving a confirmation communication in a management portal from a second registered device of a second crowd member; and communicating a new incident task to the registered device of the crowd member.

14. The computer system of claim 8, further comprising:
determining that there are no outstanding incident tasks; and
recording a result of the selected incident plan.

15. A computer program product for dynamic role assignment, comprising:
one or more non-transitory computer-readable storage media and program instructions stored on at least one of the one or more tangible storage media, the program instructions executable by a processor to cause the processor to perform a method comprising:

identifying, by one or more processors, a crisis event based on data collected by one or more Internet-connected multimodal sensors, wherein the collected sensor data is received and analyzed by the one or more processors, wherein the one or more processors identifies the crisis event by detecting a divergence of the collected sensor data from baseline value ranges of sensor data for a location observed by the one or more internet-connected multimodal sensors, wherein the one or more processors establishes and iteratively updates the baseline value ranges of sensor data for the location based on continuous sensor data collected by one or more internet-connected multimodal sensors for the location observed by the one or more internet-connected multimodal sensors using at least one machine learning algorithm;

responsive to identifying the crisis event based on the detected divergence of collected sensor data, selecting, by the one or more processors, an incident plan;

identifying, by the one or more processors, a plurality of crowd members based on the identified crisis event and the selected incident plan, wherein each of the plurality of crowd members is associated with a registered device;

selecting, by the one or more processors, a crowd member from the plurality of crowd members, by interrogating the one or more Internet-connected multimodal sensors and sensors of registered devices of crowd members to generate sensor data indicative of a physical location of the crowd member and to verify an ability of the crowd member to participate in the incident plan, wherein the one or more processors execute a mixed-integer linear programming formulation to calculate a score, wherein the score is calculated based on a plurality of user profile information and crowd member data collected by the one or more Internet-connected multimodal sensors and the sensors of the registered devices of a crowd members, wherein the score and the plurality of user profile information and crowd member data is used in selecting the crowd member; and communicating, using a communication module on the one or more processors, an incident role to the registered device of the crowd member, wherein the incident role is communicated by audio message to the crowd member's registered device.

16. The computer program product of claim 15, further comprising:

determining a current emotional condition and a current physical condition of the crowd member based on data collected by the one or more internet-connected sensors.

17. The computer program product of claim 15, further comprising:
   determining that there is a pending task on the selected incident plan; and
   communicating, by the communication module on the one or more processors, the pending task to the registered device of the crowd member based on determining by the sensor data that the crowd member meets a plurality of prerequisite conditions of the pending task.

18. The computer program product of claim 17, further comprising:
   requesting an acknowledgement via communication from the registered device of the crowd member that the communicated incident role can be performed, and if the requested acknowledgement is not received, reassigning the communicated incident role by communicating the incident role using the communication module on the one or more processors to a remaining crowd member who is not responsible for another pending task.

19. The computer program product of claim 18, further comprising:
   monitoring the crowd member data, wherein the crowd member data is selected from the group consisting of a status of the incident task, the current physical condition of the crowd member, and the current emotional condition of the crowd member.

20. The computer program product of claim 19, further comprising:
   receiving a communication from the registered device of the crowd member that the incident task is complete;
   initiating a test of sufficiency, based on the received communication that the incident task is complete, wherein the test of sufficiency includes receiving a confirmation communication in a management portal from a second registered device of a second crowd member; and
   communicating a new incident task to the registered device of the crowd member.

* * * * *